Jan. 1, 1924.

F. W. HEWITT 1,479,718

ELECTRIC GRILL

Filed Oct. 27, 1921

Inventor.
Frank W. Hewitt
by Heard Smith & Tennant.
Attys.

Jan. 1, 1924
F. W. HEWITT
1,479,718
ELECTRIC GRILL
Filed Oct. 27, 1921
3 Sheets-Sheet 2
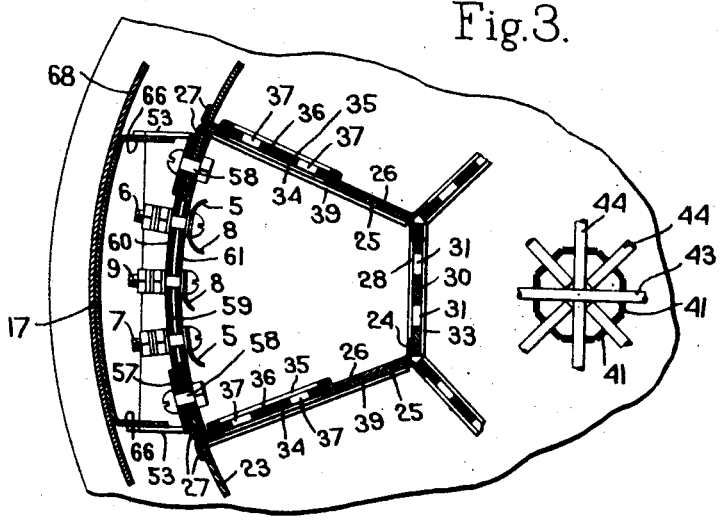
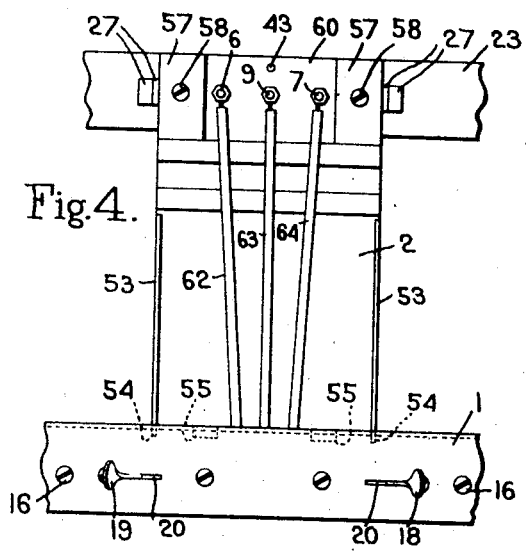
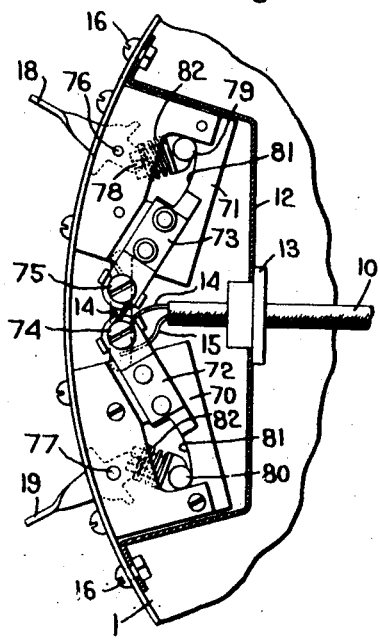
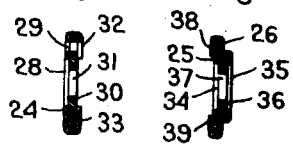
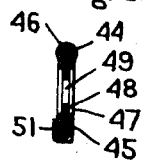
Inventor
Frank W. Hewitt
by Heard Smith & Tennant
Attys.

Jan. 1, 1924. 1,479,718

F. W. HEWITT

ELECTRIC GRILL

Filed Oct. 27, 1921   3 Sheets-Sheet 3

Inventor.
Frank W. Hewitt
by Heard Smith & Tennant.
Attys.

Patented Jan. 1, 1924.

1,479,718

UNITED STATES PATENT OFFICE.

FRANK W. HEWITT, OF ARLINGTON, MASSACHUSETTS, ASSIGNOR TO SIMPLEX ELECTRIC HEATING COMPANY, OF CAMBRIDGE, MASSACHUSETTS, A CORPORATION OF MASSACHUSETTS.

ELECTRIC GRILL.

Application filed October 27, 1921. Serial No. 510,834.

*To all whom it may concern:*

Be it known that I, FRANK W. HEWITT, a citizen of the United States, and resident of Arlington, county of Middlesex, State of Massachusetts, have invented an Improvement in Electric Grills, of which the following description, in connection with the accompanying drawing, is a specification, like characters on the drawing representing like parts.

This invention relates to an electric grill or similar device such as commonly employed for cooking purposes.

The object of the invention is to provide a neat and compact device which may be readily manufactured and assembled at a minimum cost.

The object of the invention is further to provide such a device in which there shall be as many duplicate parts as possible, thus simplifying the work of manufacturing and assembling.

The object of the invention is further to provide such a device in which the switch mechanism for controlling the heating element shall be concealed preferably in the base, leaving projecting only the necessary controlling element.

The object of the invention is further to provide such a device in which the electric connections extending from the conductor to the resistance element of the heating bed shall be concealed preferably in a hollow vertical standard.

The object of the invention is further to provide a construction in which access may readily be had to the electric connections for replacement or repair.

The object of the invention is further to provide a device which shall have a neat and pleasing appearance and which shall be of a strong and durable nature.

These and other objects and features of the invention will appear more fully from the accompanying description and drawings and will be particularly pointed out in the claims.

In the drawings:

Fig. 3 is a view in transverse cross section showing a portion of the heating bed.

Fig. 4 is a side elevation of the grill partially broken away with the cover plate of the standard and the peripheral casing removed.

Fig. 5 is a bottom plan view showing the mechanism of the switch with the switch casing in cross section.

Fig. 6 is a detail in cross section taken on the line 6—6 of Fig. 1.

Fig. 7 is a detail in cross section taken on the line 7—7 of Fig. 1.

Fig. 8 is a detail taken on the line 8—8 of Fig. 1.

The main frame-work of the grill is preferably made of sheet metal, such as sheet steel, with the main surfaces nickel-plated and the entire device is of the ordinary size employed for such devices.

Figure 1:
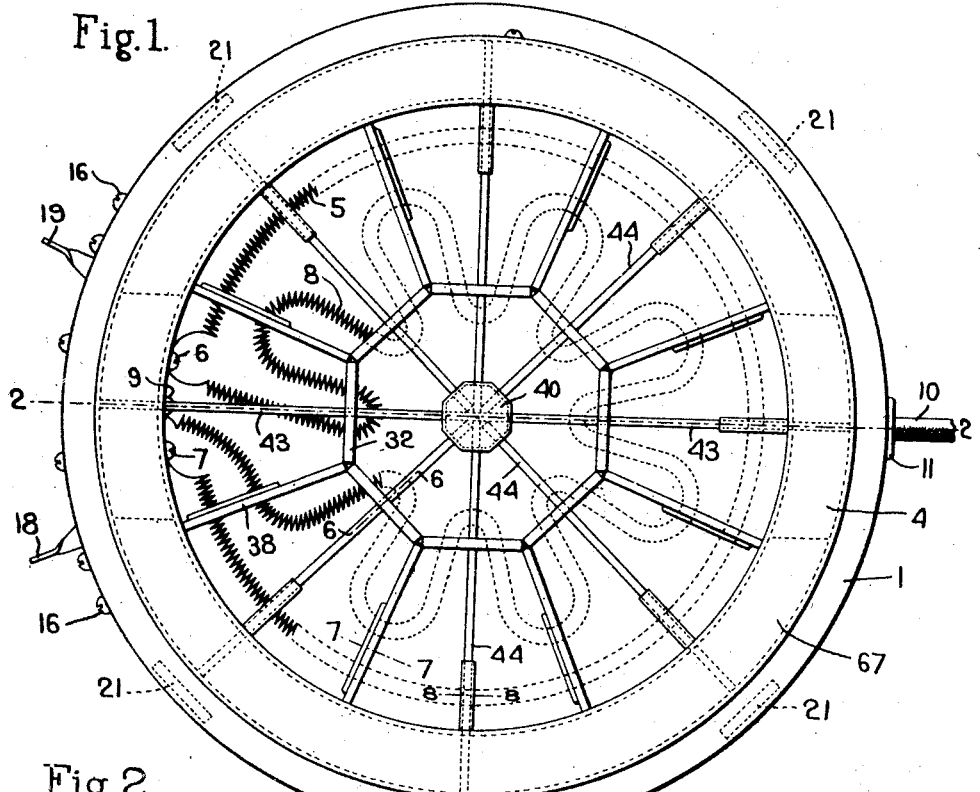
Fig. 1 is a top plan view of the grill.

The grill is preferably of circular form and comprises in its main features a flat circular hollow base 1, two vertical hollow standards 2 and 3 supported from the base at diametrically disposed points and a reticulated heating bed, shown in plan view in Fig. 1, provided with a finishing peripheral casing 4, the entire device presenting a compact, neat and pleasing appearance.

One feature of the invention relates to the general construction and control of the heating or resistance element. The grill is arranged, as is usual, to provide for three degrees of heat, but the particular number may of course be varied by making a suitable connection therefor. The heating or resistance element, as is preferable, is shown as composed of suitable resistance wire capable of functioning in the atmosphere and is preferably wound into helical form. This element is shown in two sections, one section 5 extending in a circle adjacent the periphery of the heating bed and connected to the terminals 6 and 7, and the other section 8 extending in a sinuous course in the heating bed inside of the first section and connected to the terminals 6 and 9. The conductor 10, which is adapted to be connected to a suitable source of electric energy, such as the usual lamp socket, extends through the vertical flange or periphery of the base 1 at one side thereof being insulated from the base by a suitable insulating collar 11. It then extends through the hollow interior of the base 1 and enters a switch casing 12 located inside and adjacent the periphery of the hollow base. The conductor is insulated from the switch casing by a suitable insulating collar 13. Inside the switch casing the conductor wires 14 and 15 of the conductor are connected to the switch mechanism. The connections between the switch mechanism located inside the hollow base and the resistance element located in the heating bed are made through one of the hollow standards 2. The switch casing 12 is removably attached to the base by bolts 16 and the vertical standard 2 is likewise provided with a removable cover plate 17. Thus, the connections between the conductor and the resistance or heating element are concealed from view and adequately protected. The switch mechanism is controlled by two small handles 18 and 19 projecting from the switch casing through slots 20 in the hollow base 1. This construction eliminates the use of the bulky plug connection generally employed in such devices, provides a simple and effective control of the heating or resistance element and prevents any possibility of the user coming into contact with the connections and receiving a shock. It also simplifies the control of the heater because all that is necessary to do is to operate one or the other or both of the small handles 18 and 19 to secure the required degree of heat. This construction also renders the entire device very compact by reason of the concealment of the switch mechanism and the connections and gives a neat and pleasing appearance to the grill.

The base 1 may be supported in any suitable manner and is shown as carried by metal disks 21 riveted at 22 to the base and projecting slightly below. Preferably, there are three of these disks, thus giving a three-point support.

The main body of the heating bed comprises a vertically disposed peripheral plate 23 preferably, as in the form shown, of circular shape and an interior reticulated portion, preferably as shown, made up of a plurality of similar construction units locked together into a solid structure serving as the main support for the heating or resistance element. The provision of the plurality of similar construction units materially simplifies the cost of construction.

Figure 9:
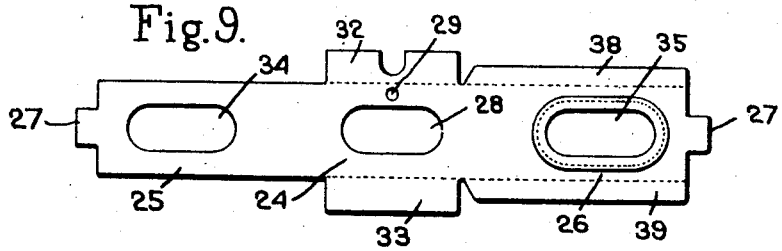
Fig. 9 is a development of one of the construction units of the heating bed.

One of the construction units is shown developed in Fig. 9, and in the construction illustrated there are eight of these units, but it is obvious that the particular number and shape may be varied. Each unit, as illustrated, comprises a sheet metal plate having a central section 24 and wing sections 25 and 26 extending therefrom and, when in position, bent so as to diverge from the central section, as shown in Fig. 3. The wing sections 25 and 26 at their ends are provided with tabs 27 which, when the unit is in position, are passed through vertical slots in the plate 23 and bent back upon the exterior face of the plate so as to hold the unit in fixed position. The central section 24 is provided with a window opening 28 and preferably also centrally above the same with a small circular opening 29. A piece of mica 30 or other suitable insulating material provided with apertures 31 to receive the heating element is placed opposite the face of the window opening 28 and the upper flanged portion 32 and the lower flanged portion 33 of the central section 24 are bent over and clamped against this mica window holding it in place opposite the opening 28. The wing section 25 is provided with a window opening 34 and the wing section 26 is provided with a similar window opening 35 formed in an inwardly struck portion which presents a seat to receive an insulation window 36 of mica or other suitable insulating material provided with apertures 37 for the heating element. The arrangement is such that when the construction units are assembled, the window opening 34 of one unit is juxtaposed on the window opening 35 of the next unit with the insulation window 36 between. The wing section 26 is provided at its upper longitudinal edge with a flanged portion 38 and at its lower longitudinal edge with a flanged portion 39, and these flanged portions are bent over the edges of the juxtaposed wing section 25 of the next unit, thus locking the units together and holding the insulation windows 36 firmly in place.

These construction units together with the peripheral plate 23 are thus readily assembled into the main body of the heating bed, and when the heating or resistance element is threaded through the apertures in the various insulation windows, this heating bed serves to support the heating or resistance element in the required position. The element 5 is threaded through the outer apertures 37 of the insulation windows in a circular form, as shown, while the element 8 is threaded through one of the apertures 31 back through the next aperture 31, thence through the inner aperture 37 and so on in a sinuous form, as illustrated. The main body of the heating bed is therefore made up of the outer peripheral vertical plate, an inner vertical annular plate formed by the connected central sections 24 of the construction units and which, as in the case illustrated, takes an octangular form, and the radial rib plates formed by the connected wing sections of the construction units and extending between and connecting the outer peripheral plate and the inner annular plate.

Figure 2:
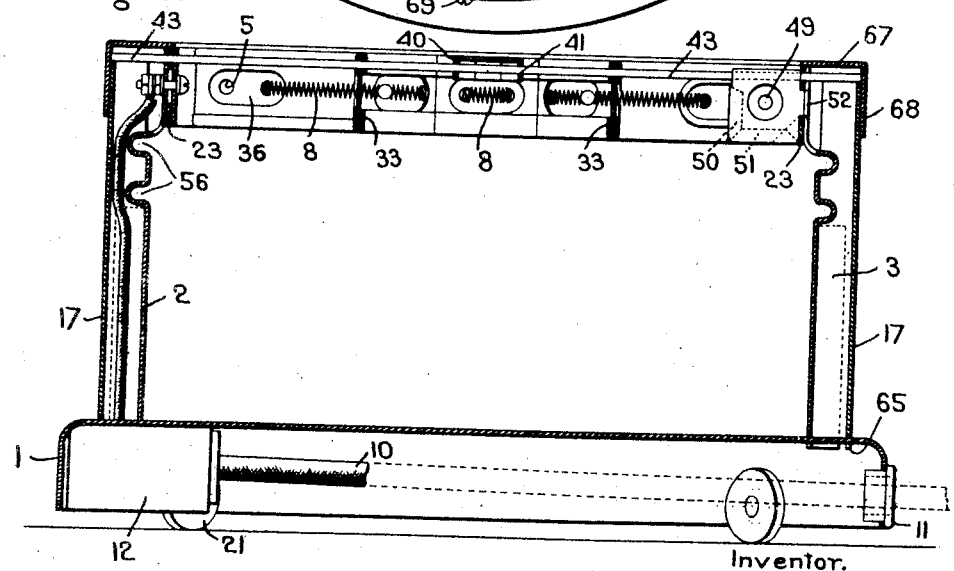
Fig. 2 is a view in central vertical cross section taken on the line 2—2 of Fig. 1.
Figure 10:
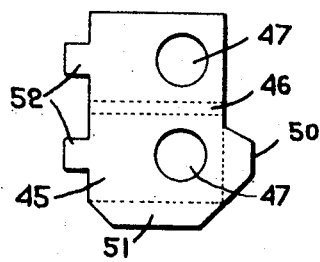
Fig. 10 is a development of one of the auxiliary plates of the heating bed.
Figure 11:
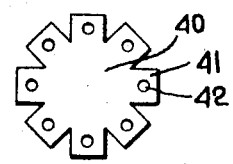
Fig. 11 is a development of the central rosette of the heating bed.
Figure 12:
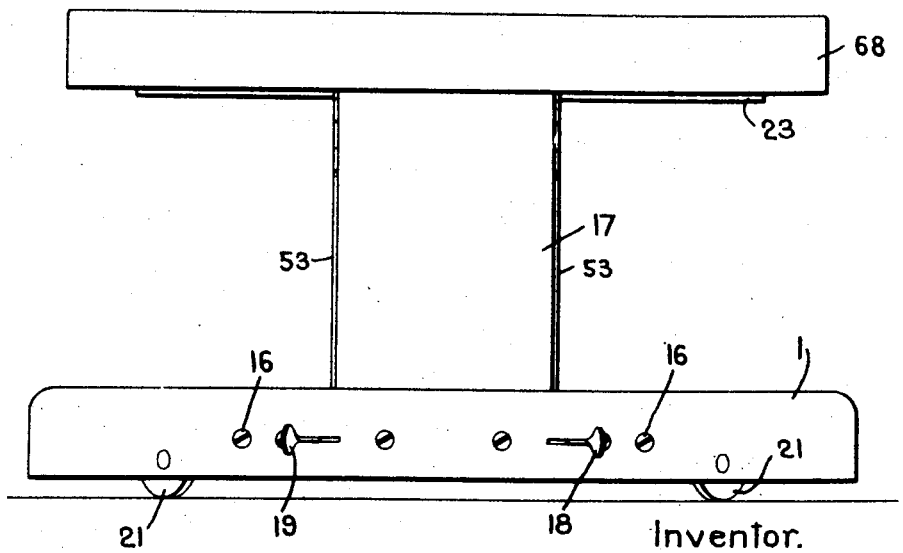
Fig. 12 is a side elevation looking toward the left of Fig. 1.

The heating bed is further strengthened and reinforced and the heating or resistance element is further supported by a set of radial bars and a set of auxiliary plates supported from these radial bars. These bars, shown as round metal rods, extend radially of the heating bed through the openings 29 provided in the central sections of the construction units. At their outer ends they pass through suitable apertures in the peripheral plate 23 and at their inner ends are centered and supported by a central rosette. This rosette 40 in the form illustrated is made of sheet metal and is shown developed in Fig. 11. It is provided preferably with as many radial tabs 41 as there are construction units, and each tab is provided with an aperture 42. These tabs are struck or bent down at right angles to the body of the rosette, as shown in Fig. 2, and the rods pass through the apertures 42. Preferably one of the rods 43 extends entirely across the diameter of the heating bed and thus forms two of the radial rods. The other radial rods 44 abut against the rod 43 inside the rosette and thus all the rods are radially centered. All the rods preferably project radially beyond the peripheral plate 23, as shown in Fig. 2, to the full diameter of the device. The auxiliary supporting plates are mounted one on each of the rods 43 and 44 near the periphery and serve as additional supports to the heating or resistance element 5. One of these auxiliary plates 45 is shown developed in Fig. 10, while the cross section in Fig. 8 shows the auxiliary plate in an assembled position. The auxiliary plate is bent back upon itself with the central section 46 fitting over the radial rod 44. The circular window openings 47 are brought into alignment and a window of mica or other insulating material 48 is interposed to bring the aperture 49 therein centrally of the window openings 47. The tabs 50 and 51 are then bent back to hold the insulating window 49 locked in place. Each auxiliary plate is therefore supported by a rod and it is held in position by the tabs 52 being passed through slots in the peripheral plate 23 and bent back on the exterior face thereof.

The vertical standards 2 and 3 are preferably of similar sectional construction being shown as composed of two vertical sections, a body and a cover plate. Referring more particularly to the standard 2, the body of the standard, shown in Fig. 4 where the cover plate is removed, is provided with side flanges 53. Tabs 54 on the bottom of these side flanges and tabs 55 on the back of the body project through slots in the top plate of the base and are bent back to hold the standard in position. Near the upper end, the body of the standard is bent, as shown, to form the inner recesses 56 which serve to receive the flanges of cooking vessels and support them beneath the heating plate in the usual manner. The upper portion of the body of the standard is provided with upwardly projecting tabs 57 and these tabs are securely fastened as by the bolts 58 to the peripheral plate 23.

In the case of the standard 2 through the electrical connections are made, the vertical peripheral plate 23 is cut away at its central portion to form the window opening 59 and strips of insulating material 60 and 61, such as mica, are placed on each side of the peripheral plate 23 opposite the opening 59 and held in place by the bolts 58. The terminals 6, 7 and 9, already referred to, are shown as suitable bolts provided with the necessary washers and nuts and are mounted in these insulating plates 60 and 61 through the opening 59. Insulated connecting wires 62, 63 and 64 extend from these terminals 6, 7 and 9 respectively down through the hollow standard and at the top of the base run into the switch casing. The cover plates 17 of each standard are provided with tabs 65 fitting slots in the top of the base 1. Each cover plate is also provided with side flanges 66 fitting within the flanges 53 of the body of the standard and fitting in between the bent portions forming the recesses 56 so that when these covers are in place the interior of each standard is enclosed and protected.

The covers of the standards and the radial rods are held in position and the heating bed is given a suitable finish preferably by a removable peripheral casing member 67 presenting a flat annular band resting on the heating bed and a peripheral flange 68 encircling the exterior of the heating bed. This peripheral casing member, after the parts are assembled, is removably held in place by two or more screws 69.

The switch mechanism enclosed by the casing 12 in the hollow base 1 may be of any suitable form and construction and the details of its mechanism form no part of the present invention. So far as the switch mechanism of this invention is concerned, the important feature lies in the concealment of the entire mechanism within the hollow base, eliminating the necessity of a bulky connector plug and leaving visible only the small operating devices such as the handles 18 and 19. A generally familiar form of switch mechanism is illustrated as suitable for this purpose and is shown with sufficient detail in Fig. 5. Suitable blocks of insulating material 70 and 71 are mounted in the switch casing. On the bottom of these blocks are mounted contact plates 72 and 73 respectively. The wire 14 of the conductor 10 is connected to both of the terminals 74 and 75 of the contact plates 72 and 73 respectively. Contact plates similar to 72 and 73 are mounted on the upper surfaces of the blocks 70 and 71 and provided with suitable terminals, to the former of which the wire 63 is connected and to the latter of which the wire 64 is connected. The wire 15 of the conductor is connected directly to the wire 62 or, in fact, the wire 62 may be a part of the wire 15, and thus the wire 15 may be connected directly to the terminal 6. The handles 18 and 19 are pivoted respectively at 76 and 77 and are prolonged beyond their pivots and provided with pins 78 engaging the bifurcated ends of the snap bars 79 and 80 respectively. Each snap bar is guided against the curved surface 81 of the insulation blocks 70 and 71 and is surrounded by a helical spring 82 abutting against the pin 78. In the position shown in Fig. 5 both switches are open and no current can flow through the heating or resistance element. If now the handle 18 be swung toward the center of the vertical standard 2, the snap bar 79 will snap over and engage the contact plates 73 and the one just above it, thus causing the current to flow through the section 5 of the heating or resistance element. If the handle 18 is left in the position illustrated and the handle 19 is swung toward the center of the vertical standard, the snap bar 80 will make contact with the contact plate 72 and the one just above and the current will flow through the section 8 of the heating or resistance element. If both handles are swung toward the center of the vertical standard, then contact will be made at both points and the current will flow through both sections of the heating or resistance element.

Having thus described my invention, what I claim as new and desire to secure by Letters Patent, is:

1. A heating bed for an electric grill comprising a vertical peripheral plate, an inner vertical annular plate, radial rib plates connecting said peripheral and annular plates, insulation windows in said various plates, and a resistance element extending through and sustained by the said insulation windows.

2. A heating bed for an electric grill having the construction defined in claim 1 in which the resistance element is in two sections, one section extending through and sustained by insulation windows in the radial rib plates adjacent the peripheral plate and the other section extending through and sustained by the insulation windows in the annular plate and the radial rib plates in a sinuous course.

3. A heating bed for an electric grill comprising a vertical peripheral plate, an inner vertical annular plate, radial rib plates connecting said peripheral and annular plates, radial bars extending through said peripheral and annular plates between the rib plates, auxiliary plates supported from said radial bars, insulation windows in said various plates, and a resistance element extending through and sustained by the insulation windows.

4. A heating bed for an electric grill comprising the construction defined in claim 3 in which the resistance element is in two sections, one section extending through and sustained by the insulation windows in the radial rib plates and the auxiliary plates adjacent the peripheral plate and the other section extending through and sustained by the insulation windows in the annular plate and the radial rib plates in a sinuous course.

5. An electric grill comprising a reticulated heating bed, a resistance element insulated from and supported in the bed and exposed in the reticulations thereof, a rosette at the center of the bed, rods extending radially from the rosette and supported in the bed, and a peripheral casing surrounding the bed, covering the outer ends of the rods, and providing a finished edge for the bed.

6. An electric grill comprising a base, a reticulated heating bed, vertical, hollow, sectional standards mounted on the base and supporting the bed, and a peripheral casing surrounding the bed, covering the upper ends of the standards and holding the sections thereof in position and providing a finished edge for the bed.

7. An electric grill comprising a hollow base, vertical standards on the base, a heating bed supported on the vertical standards, a resistance element insulated from and supported in the bed, a switch having its operative mechanism mounted in and concealed by the hollow base with its controller projecting exteriorly of the base, an electric conductor extending into the base, and connections respectively between the switch and the conductor and the switch and the resistance element.

8. An electric grill comprising the construction defined in claim 7 in which one of the vertical standards is hollow and in which the connections between the switch and the resistance element extend through and are concealed by the hollow standard.

9. An electric grill comprising a heating bed, a resistance element insulated from and supported in the bed, a hollow support for the bed, a switch having its operative mechanism mounted in and concealed by the hollow support with its controller projecting exteriorly therefrom, an electric conductor extending into the hollow support and connections respectively between the switch and the conductor and the switch and the resistance element.

10. An electric grill comprising a heating bed having a vertical peripheral plate, a base, a sectional hollow vertical standard, one section of the vertical standard being connected to the base and to the peripheral plate and the other section of the vertical standard being removably mounted with respect to the first section whereby access may readily be had to the interior of the standard.

11. An electric grill comprising the construction defined in claim 10 in which electric connections to the heating bed are provided and which extend through the said hollow standard and are concealed thereby.

12. A construction unit for a heating bed for an electric grill, the said unit comprising a metal plate having a central section and wing sections diverging therefrom at the ends thereof, both wing sections having similarly disposed window openings and the longitudinal edges of one wing section being flanged to embrace the longitudinal edges of the opposite wing section of a corresponding unit when juxtaposed, whereby a plurality of the units may be juxtaposed in a circular series into an integral annular structure.

13. A construction unit for a heating bed for an electric grill comprising the construction defined in claim 12 in which the walls of one wing section surrounding the opening therein are struck in toward the other wing section to provide a seat for an insulation window.

14. A construction unit for a heating bed for an electric grill having the construction defined in claim 12 in which the central section of the unit has a window opening and flanges on its edges bent back on the central section to hold in place an insulation window covering said opening.

15. A heating bed for an electric grill comprising a vertical peripheral plate and a plurality of construction units juxtaposed in a circular series, each unit having a central section and wing sections diverging therefrom at the ends thereof, both wing sections of each unit having similarly disposed window openings with the longitudinal edges of one wing section of each unit flanged to embrace the longitudinal edges of the opposite wing section of the next unit and means for connecting the ends of the wing sections of each unit to the peripheral plate.

16. A heating bed for an electric grill having the construction defined in claim 15 together with windows of insulation material disposed between the window openings of the juxtaposed wing sections and clamped in place thereby.

17. A heating bed for an electric grill comprising a vertical peripheral plate and a plurality of construction units juxtaposed in a circular series, each unit having a central section and wing sections diverging therefrom at the ends thereof, both wing sections of each unit having similarly disposed window openings with the longitudinal edges of one wing section of each unit flanged to embrace the longitudinal edges of the opposite wing section of the next unit and tabs on the ends of the wing sections projecting through the slots in the peripheral plate and bent back to clamp the units to the peripheral plate.

In testimony whereof, I have signed my name to this specification.

FRANK W. HEWITT.